United States Patent
De Pena et al.

(10) Patent No.: US 10,518,476 B2
(45) Date of Patent: *Dec. 31, 2019

(54) GENERATING A THREE-DIMENSIONAL OBJECT

(71) Applicant: Hewlett-Packard Development Company, L.P., Houston, TX (US)

(72) Inventors: Alejandro Manuel De Pena, Sant Cugat del Valles (ES); Esteve Comas Cespedes, Sant Cugat del Valles (ES); Luis Baldez, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/052,313

(22) Filed: Aug. 1, 2018

(65) Prior Publication Data

US 2018/0339458 A1    Nov. 29, 2018

Related U.S. Application Data

(63) Continuation of application No. 15/112,132, filed as application No. PCT/EP2014/050841 on Jan. 16, 2014.

(51) Int. Cl.
*B29C 35/08* (2006.01)
*B29C 64/386* (2017.01)
(Continued)

(52) U.S. Cl.
CPC ............ *B29C 64/386* (2017.08); *B29C 64/00* (2017.08); *B29C 64/165* (2017.08); *B29C 64/40* (2017.08);
(Continued)

(58) Field of Classification Search
CPC ......... B33Y 10/00; B33Y 30/00; B33Y 50/00; B33Y 50/02
See application file for complete search history.

(56) References Cited

U.S. PATENT DOCUMENTS 6,316,948 B1   11/2001   Briefer
6,799,959 B1   10/2004   Tochimoto et al.
(Continued)

FOREIGN PATENT DOCUMENTS

EP   1452298        9/2004
EP   1737646 B1    1/2007
(Continued)

OTHER PUBLICATIONS

European Patent Office, International Search Report for PCT/EP2014/050841 dated Sep. 25, 2014, 12 pages.
(Continued)

*Primary Examiner* — Ryan M Ochylski
(74) *Attorney, Agent, or Firm* — HP Inc. Patent Department

(57) ABSTRACT

According to one aspect there is provided apparatus for generating a three-dimensional object. The apparatus comprises a first agent distributor to selectively deliver a coalescing agent onto portions of a layer of build material, a second agent distributor to selectively deliver a coalescence modifier agent onto portions of a layer of build material, and a controller to control the agent distributors to selectively deliver each of the agents onto a layer of build material in respective patterns derived from data representing a slice of a three-dimensional object to be generated, so that when energy is applied to the layer the build material coalesces and solidifies to form a slice of the three-dimensional object in accordance the patterns.

19 Claims, 6 Drawing Sheets

(51) Int. Cl.
    *B33Y 50/02*     (2015.01)
    *B29C 64/165*     (2017.01)
    *B33Y 10/00*     (2015.01)
    *B33Y 30/00*     (2015.01)
    *B29C 64/00*     (2017.01)
    *B29C 64/40*     (2017.01)
    *B29K 105/00*     (2006.01)

(52) U.S. Cl.
    CPC ............... *B33Y 10/00* (2014.12); *B33Y 30/00* (2014.12); *B33Y 50/02* (2014.12); *B29K 2105/251* (2013.01)

(56) References Cited

U.S. PATENT DOCUMENTS

| | | |
|---|---|---|
| 8,047,251 B2 | 11/2011 | Khoshnevis |
| 10,220,564 B2 * | 3/2019 | Nauka .................... B29C 64/00 |
| 2006/0244169 A1 | 11/2006 | Monsheimer et al. |
| 2007/0238056 A1 | 10/2007 | Baumann et al. |
| 2007/0241482 A1 | 10/2007 | Giller et al. |
| 2010/0244333 A1 | 9/2010 | Bedal et al. |
| 2016/0332375 A1 | 11/2016 | Juan et al. |

FOREIGN PATENT DOCUMENTS

| | | |
|---|---|---|
| EP | 1648686 | 12/2009 |
| JP | 2001150556 | 6/2001 |
| JP | 2001334581 A | 12/2001 |
| JP | 2003231182 | 8/2003 |
| JP | 2004262243 A | 9/2004 |
| JP | 2005007572 A | 1/2005 |
| JP | 2005132110 | 5/2005 |
| JP | 2009040032 | 2/2009 |
| KR | 20120093281 | 8/2012 |
| TW | I239888 | 9/2005 |
| WO | WO-9606881 | 3/1996 |
| WO | WO-0138061 | 5/2001 |
| WO | WO-2006091842 | 8/2006 |
| WO | WO-2007039450 A1 | 4/2007 |
| WO | WO-2008151063 | 12/2008 |
| WO | WO-2012088253 A1 | 6/2012 |
| WO | WO-2013021173 | 2/2013 |
| WO | WO-2013030064 | 3/2013 |

OTHER PUBLICATIONS

Wimpenny, D.I. et al.; "Selective Infrared Sintering of Polymeric Powders using Radiant IR Heating & Ink Jet Printing"; Sep. 14, 2006; 11 pages.

* cited by examiner

GENERATING A THREE-DIMENSIONAL OBJECT

PRIORITY

This application is a Continuation of commonly assigned and co-pending U.S. patent application Ser. No. 15/112,132, filed Jul. 15, 2016, which is a National Stage filing under 35 U.S.C. § 371 of PCT Application Number PCT/EP2014/050841, having an international filing date of Jan. 16, 2014, the disclosures of which are hereby incorporated by reference in their entireties.

BACKGROUND

Additive manufacturing systems that generate three-dimensional objects on a layer-by-layer basis have been proposed as a potentially convenient way to produce three-dimensional objects in small quantities.

The quality of objects produced by such systems may vary widely depending on the type of additive manufacturing technology used. Generally, low quality and low strength objects may be producible using lower cost systems, whereas high quality and high-strength objects may be producible using higher cost systems.

BRIEF DESCRIPTION

Examples will now be described, by way of non-limiting example only, with reference to the accompanying drawings, in which.

DETAILED DESCRIPTION

Figure 1:
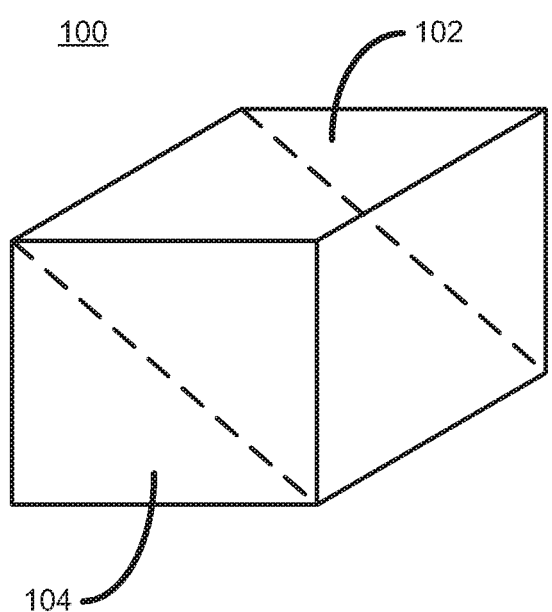
FIG. 1 is an illustration of an object model having defined object properties according to one example.

Additive manufacturing techniques may generate a three-dimensional object through the solidification of a build material. The build material can be powder-based and the properties of generated objects are dependent on the type of build material and the type of solidification mechanism used.

Additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system the model data can be processed to generate slices of parallel planes of the model. Each slice may define a portion of a respective layer of build material that is to be solidified by the additive manufacturing system. The number of slices generated from a three-dimensional model is related to the thickness of each layer that the additive manufacturing system is able to generate or process. Additive manufacturing systems that generate thinner layers of build material may be able to generate objects of a higher resolution than systems that generate thicker layers of build material. The time taken to generate a three-dimensional object may be highly dependent on the number of layers.

Variations in some object properties, such as object rigidity, for example, may be obtainable through careful design of the model of the three-dimensional object to be generated. For example, the inclusion of specific design features, such as structural ribs, into an object model may enable the rigidity of an object, or a portion of an object, to be increased compared to an object, or portion of an object, without such a feature.

However, many object properties may depend on the nature of the build materials used and the processes by which build material is solidified to form a desired three-dimensional object. Such properties may include, for example, surface roughness, accuracy, and strength.

The systems described herein, as will become apparent from the description that follows, may allow three-dimensional objects to be created that may have controllably variable, or different, object properties within a single generated object. This may allow an object to have, for example, one or more variable properties, that may include: variable accuracy properties; variable surface roughness properties; and variable strength or other mechanical or physical properties. For example, a created object may comprise one portion that has a first level of surface roughness, and a second portion that has a second level of surface roughness.

It should be noted, however, that the systems described herein are not limited to generating three-dimensional objects having variable object properties, but also allow three-dimensional objects to be generated that have substantially uniform or homogenous object properties.

Variable Object Properties

Objects having variable object properties may be generated using both data defining a three-dimensional object to be generated and object property data defining one or more object properties. Object property data may, for example, define a portion of an object and a desired object property that the defined portion is to have once the object is generated. Object property data may be defined, for example, for the whole of an object to be generated, or for one or multiple portions of an object to be generated. The object property data may also be used to define multiple object properties for a portion or portions of an object.

In one example object property data may be defined within an object model 100, as illustrated in FIG. 1. As shown in FIG. 1 an object 100 to be generated is illustrated. The object 100 has a first portion 102 that is defined to have first object properties, and has a second portion 104 that is defined to have second object properties.

In other examples object property data may be defined globally for an object. For example, an object may be defined to have a predetermined surface roughness value. In one such example global object property data may be specified in object design data. In another example, global object property data may be specified by a user, for example through a user interface of an additive manufacturing system, through a software driver, from a memory storing default or predetermined object property data, or in any other suitable manner.

Although the description herein describes three main variable object properties, in other examples other suitable object properties may be defined. Other object properties may include, for example, object porosity properties, interlayer strength properties, object elasticity properties, density, and the and the like, and may depend on the type of build material or agents used to generate an object.

Process Overview

A process of generating a tangible three-dimensional object according to an example will now be described with reference to FIGS. 2a-2g and 3. FIGS. 2a-2g show a series of cross-sections of a layer or layers of build material according to one example. FIG. 3 is a flow diagram outlining a method of generating a three-dimensional object according to one example.

Figure 2A:
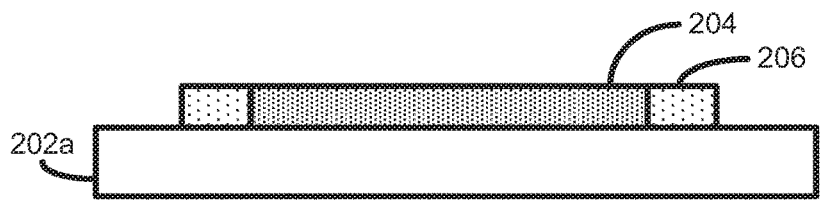
FIGS. 2a-2g show a series of cross-sections of a layer or layers of build material according to one example.
Figure 3:
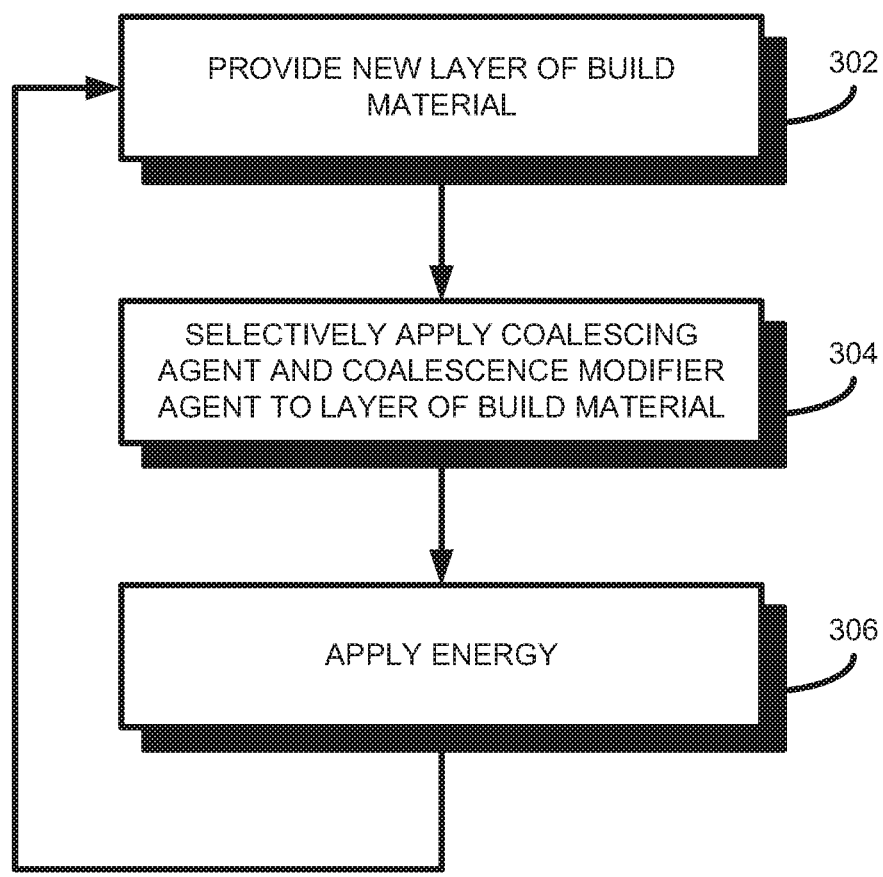
FIG. 3 is a flow diagram outlining a method of generating a three-dimensional object according to one example.

In the method of FIG. 3, at 302 a first layer 202a of build material may be provided, as shown in FIG. 2a. The first layer of build material is provided on a suitable support member (not shown). In one example the thickness of the layer of build material provided is in the range of about 90 to 110 microns, although in other examples thinner or thicker layers of build material may be provided. Using thinner layers may enable higher resolution objects to be generated but may increase the time taken to generate an object.

In the method of FIG. 3, at 304, a coalescing agent 204 and a coalescence modifier agent 206 are selectively delivered to one or more portions of the surface of the layer 202a of build material. The selective delivery of the agents 204 and 206 is performed in accordance with data derived from a model of a three-dimensional object to be created.

By selective delivery is meant that both coalescing agent and coalescence modifier agent may be delivered to selected portions of the surface layer of the build material in respective independent patterns. The patterns are defined by data derived from a model of a three-dimensional object to be created. In some examples, coalescing agent 204 may be selectively delivered to a portion of build material according to a first pattern, and coalescence modifier agent 206 may be selectively delivered to a portion of build material according to a second pattern. In one example the patterns define a bitmap.

The object properties of any portion of an object may be controllably variable depending on the patterns in which coalescing agent and coalescence modifier agent are delivered to build material.

In one example the coalescing agent 204 and coalescence modifier agent 206 are fluids that may be delivered using any appropriate fluid delivery mechanism, as will be described in greater detail below. In one example the agents are delivered in droplet form. It should be noted, however, that FIGS. 2a to 2g show the delivery of the agents in schematic form.

Figure 2B:
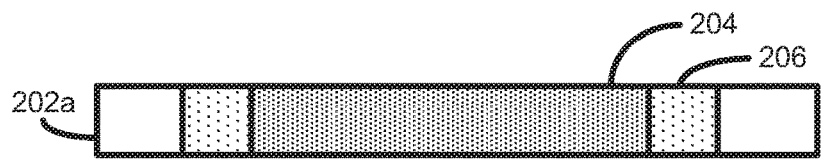
Figure 2C:
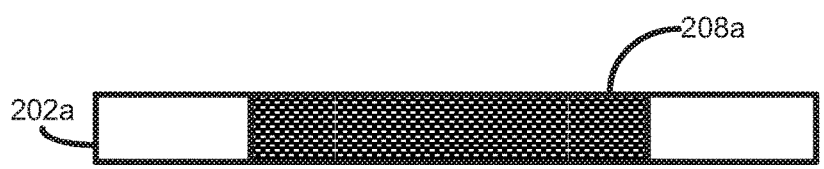

FIG. 2b shows that the agents 204 and 206 delivered to the surface of the build material penetrate into the layer 202a of build material. The degree to which the agents penetrate may differ between the two different agents, or may be substantially the same. The degree of penetration may depend, for example, on the quantity of agent delivered, on the nature of the build material, on the nature of the agent, etc. In the examples shown in FIGS. 2a-2g the agent is shown to penetrate substantially completely into the layer 202a of build material, although it will be appreciated that this is purely for the purposes of illustration and is in no way limiting. In other examples, one or both of the agents may penetrate less than 100% into the layer 202a. In some examples, one or both of the agents may penetrate completely into the layer 202a of build material. In some examples one or both of the agents may penetrate completely into the layer 202a of build material and may further penetrate into an underlying layer of build material.

Once coalescing agent and coalescence modifier agent have been delivered in the method of FIG. 3, at 306, a predetermined level of energy is temporarily applied to the layer 202a of build material. In one example the energy applied is infra-red or near infra-red energy, although in other examples other types of energy may be applied, such as microwave energy, ultra-violet (UV) light, halogen light, ultra-sonic energy or the like. The length of time the energy is applied for, or energy exposure time, may be dependent, for example, on one or more of: characteristics of the energy source; characteristics of the build material; characteristics of the coalescing agent; and characteristics of the coalescence modifier agent. The type of energy source used may depend on one or more of: characteristics of the build material; characteristics of the coalescing agent; and characteristics of the coalescence modifier agent. In one example the system 400 is configured to apply energy for predetermined length of time.

The temporary application of energy may cause portions of the build material on which coalescing agent has been delivered or has penetrated to heat up above the melting point of the build material and to coalesce. Upon cooling, the portions which have coalesced become solid and form part of the three-dimensional object being generated. One such portion is shown as portion 208a in FIG. 2c.

Energy absorbed by build material on which coalescing agent has been delivered or has penetrated may also propagate into surrounding build material and may be sufficient to cause surrounding build material to heat up. This may cause, for example, heating of build material beyond its melting point, or may cause, for example, heating of build material below its melting point but to a temperature suitable to cause softening and bonding of build material. This may result in the subsequent solidification of portions of the build material that were not intended to be solidified and this effect is referred to herein as coalescence bleed. Coalescence bleed may result, for example, in a reduction in the overall accuracy of generated three-dimensional objects.

The effects of coalescence bleed may be managed by delivering coalescence modifier agent on appropriate portions of build material. In the present example the coalescence modifier agent serves to reduce the degree of coalescence of a portion of build material on which the coalescence modifier agent has been delivered or has penetrated.

The quality of generated three-dimensional objects may depend on environmental conditions that exist whilst an object is being generated. For example, the temperature of build material may, in some situations, be carefully controlled or managed. Similarly, other environmental conditions such as ambient temperature, humidity, and the like may also be carefully controller or managed in some situations.

The coalescence modifier agent may be used for a variety of purposes. In one example, as shown in FIG. 2, coalescence modifier agent 206 may be delivered adjacent to where coalescing agent 204 is delivered, as shown in FIG. 2a, to help reduce the effects of lateral coalescence bleed. This may be used, for example, to improve the definition or accuracy of object edges or surfaces, and/or to reduce surface roughness. In another example, coalescence modifier agent may be delivered interspersed with coalescing agent (as will be described further below) which may be used to enable object properties to be modified, as mentioned previously.

The combination of the energy supplied, the build material, and the coalescing and coalescence modifier agent may be selected such that, excluding the effects of any coalescence bleed: i) portions of the build material on which no coalescing agent have been delivered do not coalesce when energy is temporarily applied thereto; ii) portions of the build material on which only coalescing agent has been delivered or has penetrated coalesce when energy is temporarily applied thereto do coalesce; and iii) portions of the build material on which only coalescence modifier agent has been delivered or has penetrated do not coalesce when energy is temporarily applied thereto.

Portions of the build material on which both coalescing agent and coalescence modifier agent have been delivered or have penetrated may undergo a modified degree of coalescence. The degree of modification may depend, for example, on any one or more of:

the proportions of the coalescing agent and the coalescence modifier agent at any portion of build material;
the pattern in which coalescing agent is delivered to build material;
the pattern in which coalescence modifier agent is delivered to build material;
the chemical properties of the coalescing agent;
the chemical properties of the coalescence modifier agent;
the chemical properties of the build material;
the chemical interaction between the build material and the agents; and
the interactions between the build material and agents whilst energy is applied.

In some examples the degree of modification may be dependent on the order in which coalescing agent and coalescence modifier agent are delivered to the build material. In some examples the degree of modification may be dependent on the timing at which coalescing agent and coalescing modifier agent are delivered to build material.

Figure 2D:
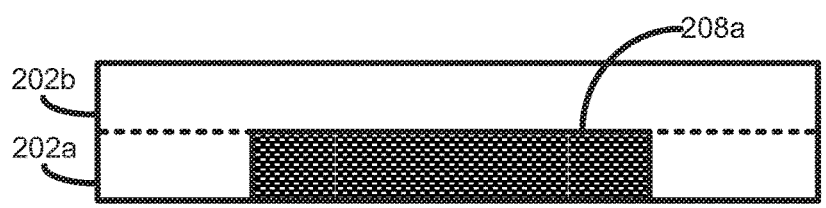

After one layer of build material has been processed as described above, a new layer of build material 202b is provided on top of the previously processed layer of build material 202a, as shown in FIG. 2d. This is illustrated in block 302 of FIG. 3. In this way, the previously processed layer of build material acts as a support for a subsequent layer of build material.

Figure 2E:
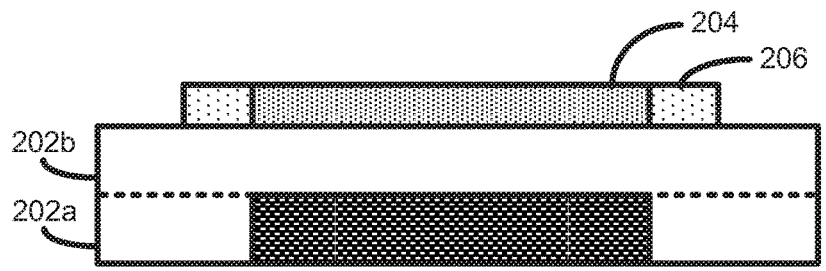
Figure 2F:
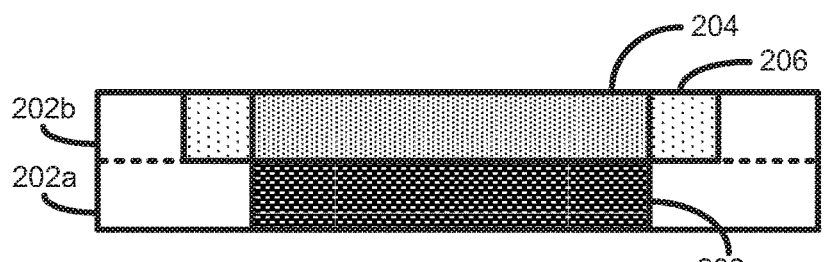
Figure 2G:
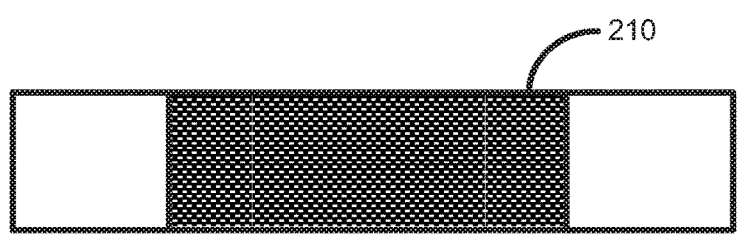

The process of blocks 304 and 306 of FIG. 3 may then be repeated to generate a three-dimensional object layer by layer. For example, FIG. 2e illustrates additional coalescing agent and coalescence modifier agent being selectively delivered to the newly provided layer of build material, in accordance with block 304 of FIG. 3. For example, FIG. 2f illustrates penetration of the agents into the build material 202b. For example, FIG. 2g illustrates coalescence and solidification of portions of build material 202b, and build material surrounding build material, where coalescing agent has been delivered or has penetrated, upon the application of energy in accordance with block 306 of FIG. 3.

Heat absorbed during the application of energy from a portion of build material on which coalescing agent has been delivered or has penetrated may propagate to a previously solidified portion, such as portion 208a, causing a portion of that portion to heat up above its melting point. This effect helps creates a portion 210 that has strong interlayer bonding between adjacent layers of solidified build material, as shown in FIG. 2g.

The generation of a three-dimensional object with controllably variable properties, as described above, is possible by modulating the manner in which coalescing agent and coalescence modifier agent are delivered to the layers of build material that are used to generate the object.

The particular manner in which coalescing agent and coalescence modifier agent are delivered to the layers of build material that are used to generate an object may enable the object to have different object properties.

System Overview

Figure 4:
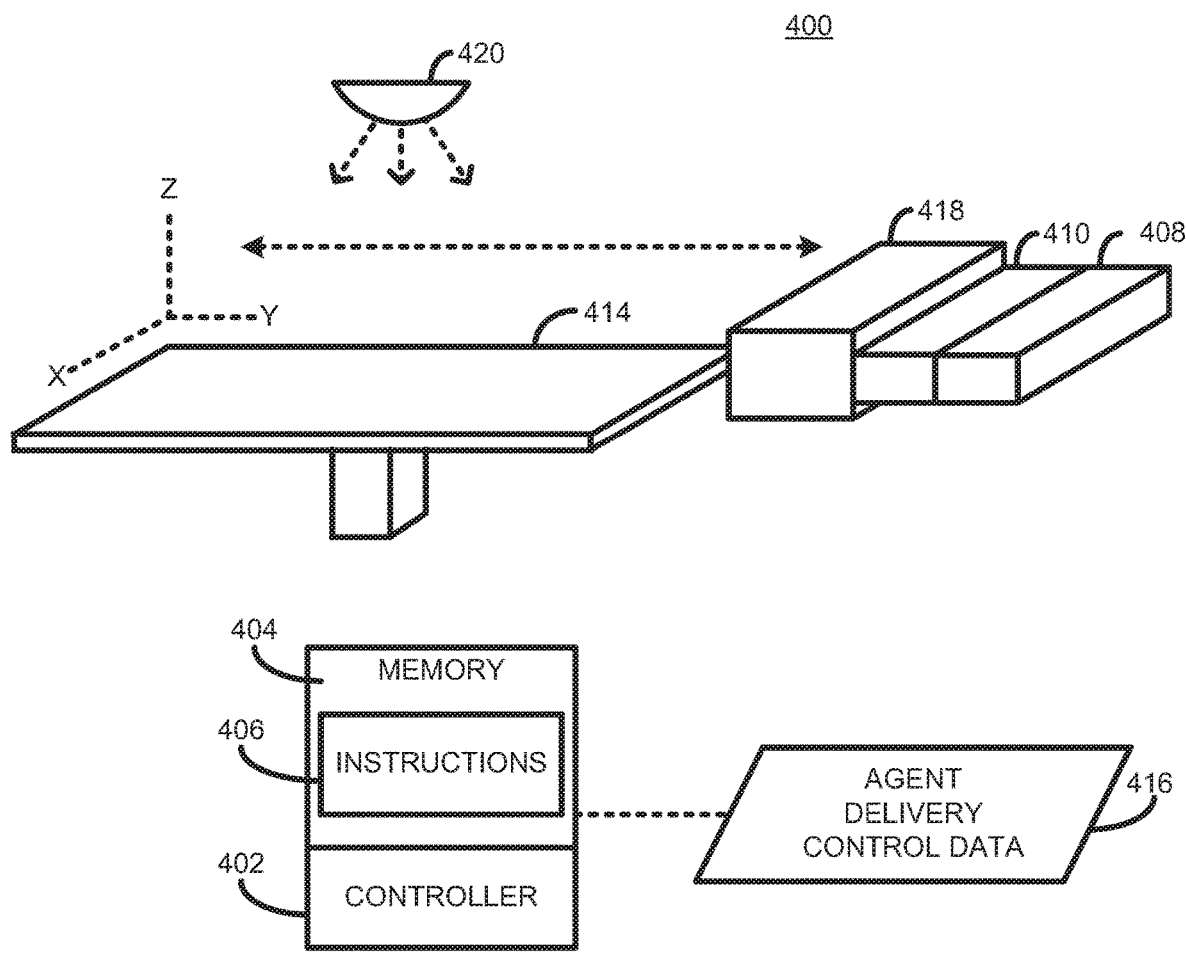
FIG. 4 is a simplified isometric illustration of an additive manufacturing system according to one example.

Referring now to FIG. 4 there is shown a simplified isometric illustration of an additive manufacturing system 400 according to an example of the present invention.

Figure 5:
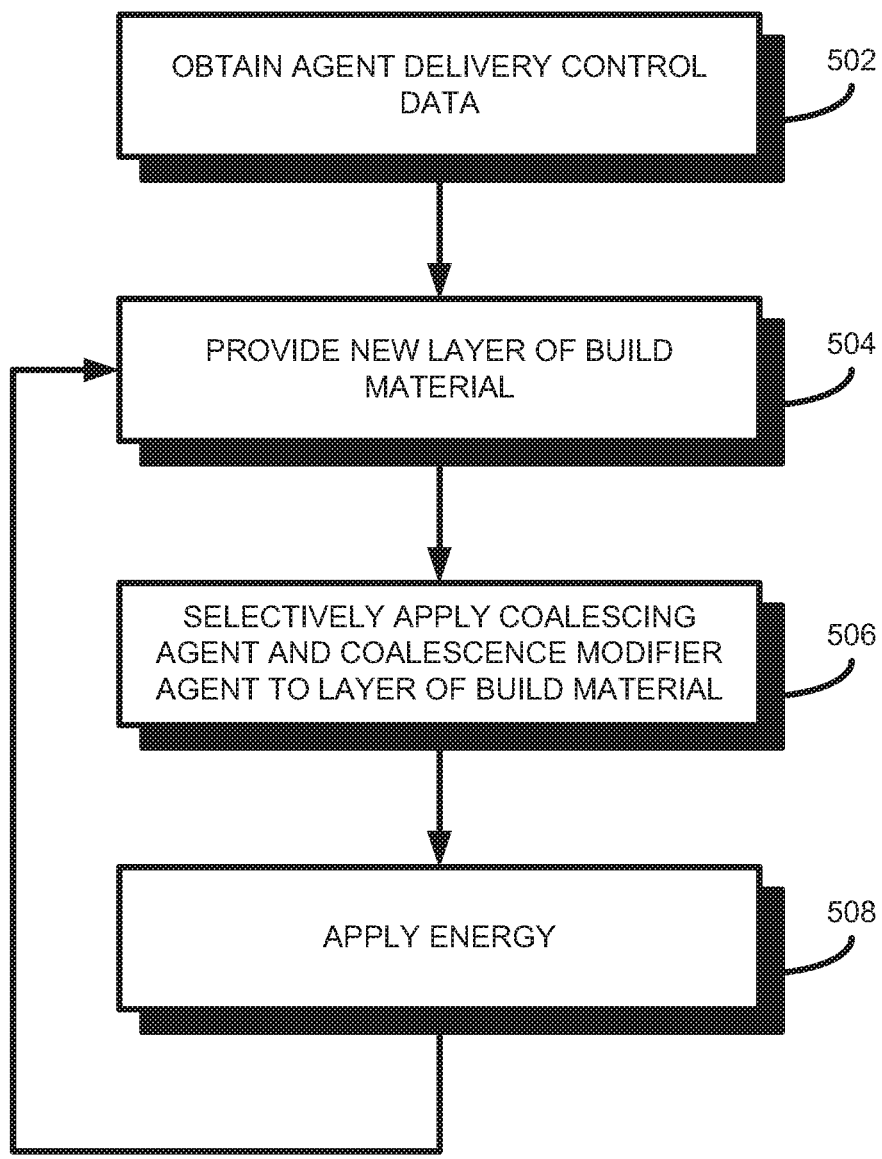
FIG. 5 is a flow diagram outlining a method of operating an additive manufacturing system according to one example.

The system 400 may be operated, as described further below with reference to the flow diagram of FIG. 5, to generate a tangible three-dimensional object by causing the selective solidification of portions of successive layers of a build material.

In one example the build material is a powder-based build material. As used herein the term powder-based materials is intended to encompass both dry and wet powder-based materials, particulate materials, and granular materials.

It should be understood, however, that the examples described herein are not limited to powder-based materials, and may be used, with suitable modification if appropriate, with other suitable build materials. In other examples the build material may be a paste or a gel, or any other suitable form of build material, for instance.

Example System Configuration

The system 400 comprises a system controller 402 that controls the general operation of the additive manufacturing system 400. In the example shown in FIG. 4 the controller 402 is a microprocessor-based controller that is coupled to a memory 404, for example via a communications bus (not shown). The memory stores processor executable instructions 406. The controller 402 may execute the instructions 406 and hence control operation of the system 400 in accordance with those instructions.

The system 400 further comprises a coalescing agent distributor 408 to selectively deliver coalescing agent to a layer of build material provided on a support member 414. In one example the support member has dimensions in the range of from about 10 cm by 10 cm up to 100 cm by 100 cm. In other examples the support member may have larger or smaller dimensions.

The system 400 also comprises a coalescence modifier agent distributor 410 to selectively deliver coalescence modifier agent to a layer of build material provided on a support member 414.

The controller 402 controls the selective delivery of coalescing agent and coalescence modifier agent to a layer of provided build material in accordance with agent delivery control data 416.

In the example shown in FIG. 4 the agent distributors 408 and 410 are printheads, such as thermal printheads or piezo inkjet printheads. In one example printheads such as suitable printheads commonly used in commercially available inkjet printers may be used.

The printheads 408 and 410 may be used to selectively deliver coalescing agent and coalescence modifier agent when in the form of suitable fluids. In one example the printheads may be selected to deliver drops of agent at a resolution of between 300 to 1200 dots per inch (DPI). In other examples the printheads may be selected to be able to deliver drops of agent at a higher or lower resolution. In one example the printheads may have an array of nozzles through which the printhead is able to selectively eject drops of fluid. In one example, each drop may be in the order of about 10 pico liters (pl) per drop, although in other examples printheads that are able to deliver a higher or lower drop size may be used. In some examples printheads that are able to deliver variable size drops may be used.

In some examples the agent distributor 408 may be configured to deliver drops of coalescing agent that are larger than drops of coalescence modifier agent delivered from the agent distributor 410.

In other examples the agent distributor 408 may be configured to deliver drops of coalescing agent that are the same size as drops of coalescence modifier agent delivered from the agent distributor 410.

In other examples the agent distributor 408 may be configured to deliver drops of coalescing agent that are smaller than drops of coalescence modifier agent delivered from the agent distributor 410.

In some examples the first and second agents may comprise a liquid carrier, such as water or any other suitable solvent or dispersant, to enable them to be delivered via a printhead.

In some examples the printheads may be drop-on-demand printheads. In other examples the printheads may be continuous drop printheads.

In some examples, the agent distributors 408 and 410 may be an integral part of the system 400. In some examples, the agent distributors 408 and 410 may be user replaceable, in which case they may be removably insertable into a suitable agent distributor receiver or interface module (not shown).

In some examples a single inkjet printhead may be used to selectively deliver both coalescing agent and coalescence modifier agent. For example, a first set of printhead nozzles of the printhead may be configured to deliver coalescing agent, and a second set of printhead nozzles of the printhead may be configured to deliver coalescence modifier agent.

In the example illustrated in FIG. 4, the agent distributors 408 and 410 have a length that enables them to span the whole width of the support member 414 in a so-called page-wide array configuration. In one example this may be achieved through a suitable arrangement of multiple printheads. In other examples a single printhead having an array of nozzles having a length to enable them to span the width of the support member 414 may be used. In other examples, the agent distributors 408 and 410 may have a shorter length that does not enable them to span the whole width of the support member 414.

The agent distributors 408 and 410 are mounted on a moveable carriage (not shown) to enable them to move bi-directionally across the length of the support 414 along the illustrated y-axis. This enables selective delivery of coalescing agent and coalescence modifier agent across the whole width and length of the support 414 in a single pass. In other examples the agent distributors 408 and 410 may be fixed, and the support member 414 may move relative to the agent distributors 408 and 410.

It should be noted that the term 'width' used herein is used to generally denote the shortest dimension in the plane parallel to the x and y axes illustrated in FIG. 4, whilst the term 'length' used herein is used to generally denote the longest dimension in this plane. However, it will be understood that in other examples the term 'width' may be interchangeable with the term 'length'. For example, in other examples the agent distributors may have a length that enables them to span the whole length of the support member 414 whilst the moveable carriage may move bi-directionally across the width of the support 414.

In another example the agent distributors 408 and 410 do not have a length that enables them to span the whole width of the support member but are additionally movable bi-directionally across the width of the support 414 in the illustrated x-axis. This configuration enables selective delivery of coalescing agent and coalescence modifier agent across the whole width and length of the support 414 using multiple passes. Other configurations, however, such as a page-wide array configuration, may enable three-dimensional objects to be created faster.

The coalescing agent distributor 408 may include a supply of coalescing agent or may be connectable to a separate supply of coalescing agent. The coalescence modifier agent distributor 410 may include a supply of coalescence modifier agent or may be connectable to a separate supply of coalescing agent.

The system 400 further comprises a build material distributor 418 to provide the layer of build material 202 on the support 414. Suitable build material distributors may include, for example, a wiper blade and a roller. Build material may be supplied to the build material distributor 418 from a hopper or build material store (not shown). In the example shown the build material distributor 418 moves across the length (y-axis) of the support 414 to deposit a layer of build material. As previously described, a first layer of build material will be deposited on the support 414, whereas subsequent layers of build material will be deposited on a previously deposited layer of build material.

In the example shown the support 414 is moveable in the z-axis such that as new layers of build material are deposited a predetermined gap is maintained between the surface of the most recently deposited layer of build material and lower surface of the agent distributors 408 and 410. In other examples, however, the support 414 may not be movable in the z-axis and the agent distributors 408 and 410 may be movable in the z-axis.

The system 400 additionally comprises an energy source 420 to apply energy to build material to cause the solidification of portions of the build material according to where coalescing agent has been delivered or has penetrated. In one example the energy source 420 is an infra-red (IR) or near infra-red light source. In one example the energy source 420 may be a single energy source that is able to uniformly apply energy to build material deposited on the support 414. In some examples the energy source 420 may comprise an array of energy sources.

In some examples the energy source 420 is configured to apply energy in a substantially uniform manner to the whole surface of a layer of build material. In these examples the energy source 420 may be said to be an unfocused energy source. In these examples a whole layer may have energy applied thereto simultaneously, which may help increase the speed at which a three-dimensional object may be generated.

In other examples, the energy source 420 is configured to apply energy in a substantially uniform manner to a portion of the whole surface of a layer of build material. For example, the energy source 420 may be configured to apply energy to a strip of the whole surface of a layer of build material. In these examples the energy source may be moved or scanned across the layer of build material such that a substantially equal amount of energy is ultimately applied across the whole surface of a layer of build material.

In one example the energy source 420 may be mounted on the moveable carriage.

In other examples the energy source may apply a variable amount of energy as it is moved across the layer of build material, for example in accordance with agent delivery control data. For example, the controller 402 may control the energy source only to apply energy to portions of build material on which coalescing agent has been applied.

In further examples, the energy source 420 may be a focused energy source, such as a laser beam. In this example the laser beam may be controlled to scan across the whole or a portion of a layer of build material. In these examples the laser beam may be controlled to scan across a layer of build material in accordance with agent delivery control data. For example, the laser beam may be controlled to apply energy to those portions of a layer of on which coalescing agent is delivered.

Although not shown in FIG. 4, in some examples the system 400 may additionally comprise a pre-heater to maintain build material deposited on the support 414 within a predetermined temperature range. Use of a pre-heater may help reduce the amount of energy that has to be applied by the energy source 420 to cause coalescence and subsequent solidification of build material on which coalescing agent has been delivered or has penetrated.

In some examples the support 414 may not be a fixed part of the system 400, but may, for example, be part of a removable module. In some examples both the support 414 and the build material distributor may not be a fixed part of the system 400, but may, for example, be part of a removable module. In other examples other elements of the system 400 may be part of a removable module.

System Operation

To generate a three-dimensional object the controller 402 obtains agent delivery control data 416. This is illustrated in block 502 of FIG. 5. The agent delivery control data 416 defines for each slice of the three-dimensional object to be generated the portions or the locations on the build material, if any, at which at least one of coalescing agent and coalescence modifier agent is to be delivered.

The agent delivery control data may be derived, for example, by a suitable three-dimensional object processing system (not shown). In some examples the three-dimensional object processing system may be comprised within the additive manufacturing system 400. For example, the memory 404 may additionally include instructions 406 that, when executed by the controller 402, cause the controller 402 to operate as a three-dimensional object processing system as described herein.

In other examples the three-dimensional object processing system may be external to the additive manufacturing system 400. For example, the three-dimensional object processing system may be a software application, or part of a software application, executable on a computing device separate from the system 400.

For example, such an object processing system may obtain object design data representing a three-dimensional model to be generated. The object processing system may additionally obtain object property data.

As previously described, object property data may be obtained from the object design data, or may be obtained, for example, from a user via a user interface, from a software driver, from a software application, or may be obtained from a memory storing default or user-defined global object property data.

In some examples the object processing system may obtain data relating to characteristics of the additive manufacturing system 400. Such characteristics may include, for example, build material layer thickness, properties of the coalescing agent, properties of the coalescence modifier agent, properties of the build material, and properties of the energy source.

Using such characteristics, object design data, and object property data, the object processing system may generate agent delivery control data 416 that describes, for each layer of build material to be processed, locations or portions on the build material at which at least one of coalescing agent and coalescence modifier agent are to be delivered. In one example the locations or portions of the build material at which coalescing agent and coalescence modifier agent are to be delivered are defined by way of respective patterns.

In some examples the object processing system may determine an order in which coalescing agent and coalescence modifier agent are to be delivered to build material.

In some examples the object processing system may determine an order in which coalescing agent and coalescence modifier agent are to be delivered to build material and corresponding timing data. In some examples, the timing data may define a time delay to respect between delivery coalescing agent and coalescence modifier agent.

In some examples the object processing system may additionally generate volume data indicating a volume of coalescing agent and a volume of coalescence modifier agent to be delivered at each location or portion of the build material.

Depending on the characteristics described above, the density at which coalescing agent and coalescence modifier agent are to be delivered may be varied. For example, when a portion of build material on which coalescing agent has been delivered or has penetrated receives applied energy, the energy absorbed by those portions propagates to other surrounding areas. In one example, the properties of the coalescing agent and the amount of coalescing agent delivered may be chosen such that energy radiates in a sphere in the range of about 1.5 times the layer thickness. This may help ensure not only sufficient inter-layer bonding, but also sufficient bonding between laterally adjacent portions of build material.

In this way, the object processing system may, for example, determine that the lateral spacing between adjacent drops of coalescing agent may be increased whilst still ensuring sufficient object strength. Doing so reduces the average density at which coalescing agent may be delivered to a layer of build material, and hence reduces consumption of coalescing agent, but without affecting the object strength.

In some examples the agent delivery control data may define, for any portion of build material, that coalescing agent is to be delivered before coalescence modifier agent. In other examples the agent delivery control data may define, for any portion of build material, that coalescing agent is to be delivered after coalescence modifier agent.

Controlling the operation of the system 400 in accordance with the agent delivery control data 416 enables three-dimensional objects to be generated that may have controllably variable object properties, as described above.

At block 504, the controller 402 controls the build distributor 418 to provide a first layer of build material on the support 414. In some examples the thickness of the layer of build material provided by the build distributor 418 may be fixed. In other examples the thickness of the layer of build material provided by the build distributor 418 may be modifiable, for example under control of the controller 402. To control the delivery of build material the controller 402 may cause the carriage on which the build distributor 418 is mounted to move across the length of the support 414 in the y-axis, for example in a right to left direction as shown in FIG. 4.

In some examples the controller 402 controls the build material distributor 418 to provide a complete layer of build material before controlling the coalescing agent and coalescence modifier agent distributors 408 and 410 to selectively deliver coalescing agent and coalescence modifier agent to the provided layer of build material. In these examples, delivery of coalescing agent and coalescence modifier agent would take place whilst the coalescing agent and coalescence modifier agent distributors are moving left to right along the y-axis as shown in FIG. 4.

In other examples the controller 402 controls the coalescing agent and coalescence modifier agent distributors 408 and 410 to selectively deliver coalescing agent and coalescence modifier agent to build material whilst the build material distributor 418 is providing the layer of build material. In other words, as the build material distributor 418 is providing build material to form a new layer of build material, the coalescing agent and coalescence modifier agent distributors 408 and 410 may deliver coalescing agent and coalescence modifier agent to build material of that layer that has just been provided by the build material distributor 418. In the configuration shown, the coalescing agent and coalescence modifier agent distributors and the build material distributor 418 returns to the right-hand side of the support 414 to distribute a new layer of build material whilst delivering coalescing agent and coalescence modifier agent.

Figure 6A:
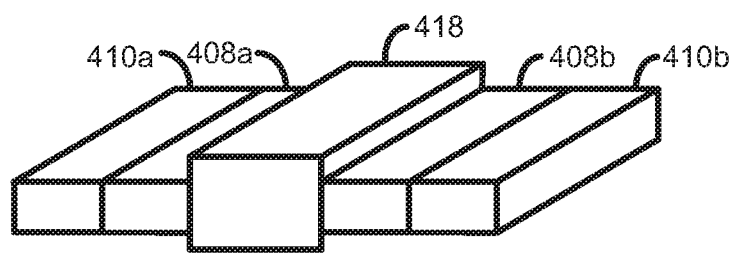
FIGS. 6a-6b show a series of simplified isometric views of configurations of portions of an additive manufacturing system according to various examples.

Increased speed and efficiency may be achievable, for example, by adding additional agent distributors to the carriage, as shown in FIG. 6a. In FIG. 6a a configuration is shown having a pair of coalescing agent distributors 408a and 408b arranged on either side of a build material distributor 418 and a pair of coalescence modifier agent distributors 410a and 410b arranged on either side of a build material distributor 418. This configuration allows a layer of build material to be deposited and coalescing agent and coalescence modifier agent to be delivered to the deposited layer whilst the carriage is moving in either direction along the y-axis, thereby enabling bi-directional operation.

Figure 6B:
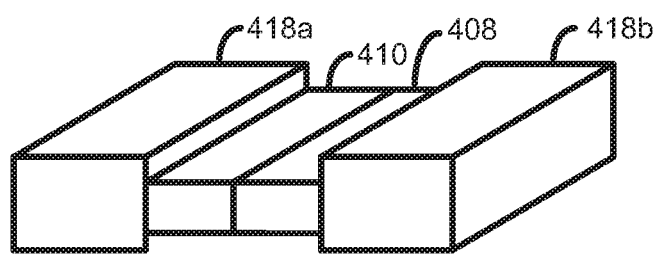

FIG. 6b illustrates another configuration according to a further example. In FIG. 6b a configuration is shown having a pair of build material distributors 418a and 418b arranged on either side of coalescing agent distributor 408 and coalescence modifier agent distributor 410. Again, this configuration allows a layer of build material to be deposited and coalescing agent and coalescence modifier agent to be delivered to the deposited layer whilst the carriage is moving in either direction along the y-axis, enabling bi-directional operation.

Such configurations may enable speed improvements compared to the configuration shown in FIG. 4, at the expense of duplication of either a build material distributor or of agent distributors.

In a further example, the build material distributor 418 may be decoupled from the agent distributors 408 and 410. For example, the build material distributor 418 may be located on a separate carriage from those on which the agent distributors 408 and 410 are located. In another example the build material distributor 418 may be located on the same carriage as the agent distributors 408 and 410 but separated by a short distance.

Alternative Configurations

Although the examples described herein refer to use of a single coalescing agent and a single coalescence modifier agent, in other examples multiple coalescing agents may be used. In other examples multiple coalescence modifier agents may be used.

For example, in some examples a first coalescing agent may be selectively deliverable from a first coalescing agent distributor and a second coalescing agent may be selectively deliverable from a second coalescing agent distributor. The first coalescing agent may have different chemical properties and/or have a different concentration from the second coalescing agent.

For example, in some examples a first coalescence modifier agent may be selectively deliverable from a first coalescence modifier agent distributor and a second coalescence modifier agent may be selectively deliverable from a second coalescing agent distributor.

In some examples, the first coalescence modifier agent may have different chemical properties from the second coalescence modifier agent. In some examples the first coalescence modifier agent may have a different concentration than the second coalescence modifier agent. In some examples the first coalescence modifier agent may have both different chemical properties and a different concentration than the second coalescence modifier agent.

For example, a first coalescence modifier agent may modify coalescence by a first factor, whereas a second coalescence modifier agent may modify coalescence by a second factor. In some examples both coalescence modifier agents may reduce the degree of coalescence by different amounts. In one example one coalescence modifier agent may reduce the degree of coalescence, and one coalescence modifier agent may increase the degree of coalescence. In one example both coalescence modifier agents may increase the degree of coalescence.

In further examples further agents may be used in addition to a coalescing agent and a coalescence modifier agent.

For example, in some examples a further agent distributor may be provided to selectively deliver an agent comprising colorant, such as colored pigment or dye to a layer of build material.

In further examples a further agent distributor may be provided to selectively deliver an agent comprising a functional agent to add a predetermined functionality to a generated three-dimensional object. For example, such an agent may comprise electrically conductive elements that enable a portion of a generated three-dimensional object to exhibit electrical conductivity.

In other examples a coalescing agent may include a suitable colorant to enable portions of a three-dimensional object to have a predetermined color.

As previously mentioned, the speed at which each layer of build material can be processed has an effect on the speed at which a three-dimensional object can be generated. Use of printheads, for example, enables small droplets of coalescing agent and coalescence modifier agent to be delivered with high accuracy to a layer of build material and at high speed.

In other examples coalescing agent and coalescing modifier agent may be delivered through spray nozzles rather than through printheads. This may enable, for example, large objects to be generated with a lower accuracy than may be achieved when using inkjet printheads, but in a shorter time. This may be particularly expedient, for example, when processing large layers of build material, for example layers of build material greater than about 200 cm by 100 cm.

Description of Materials

To enable the methods and systems to manufacture a three-dimension object as described herein to function as described the properties of the build material, coalescing agent, and coalesce modifier agent need to be carefully chosen.

Examples of suitable materials are given below.

Build Material

According to one example a suitable build material may be a powdered semi-crystalline thermoplastic material. One suitable material may be Nylon 12, which is available, for example, from Sigma-Aldrich Co. LLC. Another suitable material may be PA 2200 which is available from Electro Optical Systems EOS GmbH.

In other examples any other suitable build material may be used. Such materials may include, for example, powdered metal materials, powdered composited materials, powder ceramic materials, powdered glass materials, powdered resin material, powdered polymer materials, and the like.

Coalescing Agent

According to one non-limiting example, a suitable coalescing agent may be an ink-type formulation comprising carbon black, such as, for example, the ink formulation commercially known as CM997A available from Hewlett-Packard Company. In one example such an ink may additionally comprise an infra-red light absorber. In one example such an ink may additionally comprise a near infra-red light absorber. In one example such an ink may additionally comprise a visible light absorber. Examples of inks comprising visible light enhancers are dye based colored ink and pigment based colored ink, such as inks commercially known as CE039A and CE042A available from Hewlett-Packard Company.

Coalescence Modifier Agent

As described above, a coalescence modifier agent acts to modify the effects of a coalescing agent. It has been demonstrated that different physical and/or chemical effects may be used to modify the effects of a coalescing agent.

For example, and without being bound by any theory, in one example a coalescence modifier agent may act to produce a mechanical separation between individual particles of a build material, for example to prevent such particles from joining together and hence preventing them from solidifying to form a portion of a generated three-dimensional object. An example coalescence modifier agent may comprise a liquid that comprises solids. Such an agent may be, for example, a colloidal ink, a dye-based ink, or a polymer-based ink.

Such an agent may, after being delivered to a layer of build material, cause a thin layer of solids to cover or partially cover a portion of build material, for example after evaporation of any carrier liquid, and hence may act as a coalescence modifier agent as described herein.

In one example such a coalescence modifier agent may comprise solid particles that have an average size less than the average size of particles of the build material on which it is to be delivered. Furthermore, the molecular mass of the coalescence modifier agent and its surface tension should be such that it enables the coalescence modifier agent it to penetrate sufficiently into the build material. In one example such an agent should also have a high solubility such that each drop of agent comprises a high percentage of solids.

In one example a salt solution may be used as a coalescence modifier agent.

In another example an ink commercially known as CM996A ink and available from Hewlett-Packard Company may be used as a coalescence modifier agent. In another example an ink commercially known as CN673A ink and available from Hewlett-Packard Company has also been demonstrated to work as a coalescence modifier agent.

In another example, and without being bound by any theory, a coalescence modifier agent may act to modify the effects of a coalescing agent by preventing build material from reaching temperatures above its melting point. For example, it has been demonstrated that a fluid that exhibits a suitable cooling effect may be used as a coalescence modifier agent. For example, when such an agent is delivered to build material the energy applied to the build material may be absorbed by the coalescence modifier agent causing the evaporation thereof, which may help prevent build material on which the coalescence modifier agent has been delivered or has penetrated from reaching the melting point of the build material.

In one example an agent comprising a high percentage of water has been demonstrated as a suitable coalescence modifier agent.

In other examples other types of coalescence modifier agent may be used.

An example of a coalescence modifier agent that may increase the degree of coalescence may include, for example a suitable plasticizer. Another example of a coalescence modifier agent that may increase the degree of coalescence may include, for example, a surface tension modifier to increase the wettability of particles of build material.

It will be appreciated that examples described herein can be realized in the form of hardware, or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are example of machine-readable storage that are suitable for storing a program or programs that, when executed, implement examples described herein. Accordingly, examples provide a program comprising code for implementing a system or method as claimed in any preceding claim and a machine readable storage storing such a program.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. Apparatus for generating a three-dimensional object, comprising:
   a build material distributor to provide a first layer of build material on a build material support, and to provide subsequent layers of build material on a previously provided layer of build material;
   a first agent distributor to selectively deliver a coalescing agent onto portions of a layer of build material;
   a second agent distributor to selectively deliver a coalescence modifier agent onto portions of a layer of build material;
   an energy source to apply energy to build material; and
   a controller to:
      control the build material distributor to provide a layer of build material;
      control the agent distributors to selectively deliver each of the agents onto a layer of build material in respective patterns derived from data representing a slice of a three-dimensional object to be generated, the patterns to cause, upon application of energy to the layer of build material, an object to have properties dependent on the patterns by causing portions of the layer on which only coalescing agent is delivered or penetrates to heat up above the melting point of the build material and coalesce, and portions of the layer on which only coalescence modifier agent is delivered or penetrates not to heat up above the melting point of the build material and not to coalesce; and control the energy source to apply energy to the layer of build material.

2. The apparatus of claim 1, wherein the apparatus is to generate a three-dimensional object having at least one of mechanical, strength, accuracy properties, and surface roughness properties that are related to the patterns in which coalescing agent and coalescence modifier agent are delivered to build material or to generate a three-dimensional object having at least one of variable object porosity properties, variable object inter-layer strength properties, variable object elasticity properties, variable object density properties that are related to the patterns in which coalescing agent and coalescence modifier agent are delivered to build material.

3. The apparatus of claim 1, wherein the first and second agent distributors have a length to enable them to span the support and wherein at least one of the support and the distributors are moveable relative to the other to enable coalescing agent and coalescence modifier agent to be selectively deliverable to the surface of any portion of the layer of build material.

4. The apparatus of claim 1, wherein the first agent distributor comprises a first printhead and the second agent distributor comprises a second, different, printhead, or wherein the first agent distributor comprises a first array of nozzles of a printhead and the second agent distributor comprises a second array of nozzles of the printhead.

5. The apparatus of claim 1, wherein the controller is to control the agent distributors to selectively deliver the agents onto the surface of the layer of build material in accordance with control data derived from a combination of data representing a slice of a three-dimensional object to be generated and data representing at least one desired object property of at least one portion of the three-dimensional object to be generated.

6. The apparatus of claim 1, wherein the build material distributor is to provide a layer of build material having a layer thickness in the range of about 90 to 110 microns, and wherein the agent distributors are to provide drops of agent of about 10 Pico litres per drop.

7. The apparatus of claim 1, further comprising a third agent distributor to selectively deliver a second coalescing agent onto a layer of build material and/or a fourth agent distributor to selectively deliver a second coalescence modifier agent onto a layer of build material.

8. The apparatus of claim 1, wherein the controller is to generate control data from data representing a three-dimensional object and object property data.

9. The apparatus of claim 1, further comprising a carriage movable bi-directionally across the support on which are mounted, or on which are mountable, a pair of first agent distributors to selectively deliver a coalescing agent, a pair of second agent distributors to selectively deliver a coalescence modifier agent, and a build material distributor, the agent distributors and the build material distributor being arranged to allow delivery of build material, coalescing agent, and coalescence modifier agent whilst the carriage is moving in either direction.

10. The apparatus of claim 1, further comprising a carriage movable bi-directionally across the support on which are mounted, or on which are mountable, the first agent distributor to selectively deliver coalescing agent, the second agent distributor to selectively deliver coalescence modifier agent, and a pair of build material distributors, the agent distributors and the build material distributor being arranged to allow delivery of build material, the coalescing agent, and the coalescence modifier agent whilst the carriage is moving in either direction.

11. The apparatus of claim 1, further comprising an unfocused energy source to apply energy to build material to cause a portion of the build material to coalescence and to solidify to form a slice of the three-dimensional object in accordance with where coalescing agent and coalescence modifier agent was delivered.

12. The apparatus of claim 1, wherein the patterns to cause, upon application of energy to the layer of build material, an object to have properties dependent on the patterns by causing portions of the layer on which coalescing agent and coalescence modifier agent are delivered or penetrate to undergo a modified degree of coalescence.

13. The apparatus of claim 1, wherein the patterns to cause, upon application of energy to the layer of build material, an object to have properties dependent on the patterns by causing coalescence modifier agent to control coalescence bleed.

14. The apparatus of claim 1, wherein coalescence modifier agent is delivered adjacent to where coalescing agent is delivered to help reduce effect of lateral coalescence bleed.

15. A method of controlling a system to generate a three-dimensional object, comprising:

obtaining control data, the control data derived from data representing a portion of a three-dimensional object to be generated;

depositing a layer of build material;

selectively depositing on the layer of deposited build material, in accordance with the obtained control data, patterns of a coalescing agent and a coalescence modifier agent, the patterns to cause, upon application of energy to the layer of build material, an object to have properties dependent on the patterns by causing portions of the layer on which only coalescing agent is delivered or penetrates to heat up above the melting point of the build material and coalesce, and portions of the layer on which only coalescence modifier agent is delivered or penetrates not to heat up above the melting point of the build material and not to coalesce; and applying energy to deposited build material.

16. The method of claim 15, wherein the patterns to cause, upon application of energy to the layer of build material, an object to have properties dependent on the patterns by causing portions of the layer on which coalescing agent and coalescence modifier agent are delivered or penetrate to undergo a modified degree of coalescence.

17. The method of claim 15, wherein the patterns to cause, upon application of energy to the layer of build material, an object to have properties dependent on the patterns by causing coalescence modifier agent to control coalescence bleed.

18. The method of claim 15, wherein coalescence modifier agent is delivered adjacent to where coalescing agent is delivered to help reduce effect of lateral coalescence bleed.

19. The method of claim 15, further comprising obtaining control data, generated based on object design data and object property data, that describes, for each layer of build material to be processed, locations or portions on the build material at which at least one of coalescing agent and coalescence modifier agent are to be delivered to generate a three-dimensional object having controllably variable object properties.

* * * * *